United States Patent
Capomaggio

(10) Patent No.: US 9,642,096 B2
(45) Date of Patent: May 2, 2017

(54) WIRELESS COMMUNICATION DEVICE AND METHOD FOR TRANSMISSION OF SERVICES WITH DIFFERENT SECURITY LEVELS

(75) Inventor: Gregory Capomaggio, Meudon (FR)

(73) Assignee: GEMALTO SA, Meudon (FR)

( * ) Notice: Subject to any disclaimer, the term of this patent is extended or adjusted under 35 U.S.C. 154(b) by 1004 days.

(21) Appl. No.: 12/671,320

(22) PCT Filed: Jul. 30, 2008

(86) PCT No.: PCT/EP2008/059985
§ 371 (c)(1),
(2), (4) Date: Jan. 29, 2010

(87) PCT Pub. No.: WO2009/016198
PCT Pub. Date: Feb. 5, 2009

(65) Prior Publication Data
US 2010/0189061 A1    Jul. 29, 2010

(30) Foreign Application Priority Data

Aug. 1, 2007 (EP) .................................. 07290972

(51) Int. Cl.
*H04M 1/66* (2006.01)
*H04W 52/34* (2009.01)

(52) U.S. Cl.
CPC .................................. *H04W 52/34* (2013.01)

(58) Field of Classification Search
CPC ..... H04W 12/00; H04W 12/04; H04W 12/06; H04W 12/08
(Continued)

(56) References Cited

U.S. PATENT DOCUMENTS 7,065,378 B1 * 6/2006 Raissinia et al. ............. 455/522
7,720,018 B2 * 5/2010 Hassan et al. ................. 370/311
(Continued)

FOREIGN PATENT DOCUMENTS

EP    1 643 690 A1    4/2006
EP    1 742 500 A1    1/2007
(Continued)

OTHER PUBLICATIONS

International Search Report from PCT/EP2008/059985 dated Nov. 12, 2008 (3 pages).
(Continued)

*Primary Examiner* — Andrew Chriss
*Assistant Examiner* — Kenan Cehic
(74) *Attorney, Agent, or Firm* — Osha Liang LLP

(57) ABSTRACT

A communication device comprises an RF interface (20) and a CPU (10). The RF interface (20) has a physical channel PhCh to exchange radio messages on a wireless network. The physical channel PhCh is coupled with at least two logical channels $LC_i$. The CPU (10) is connected to the RF interface (20) to provide at least two services $S_i$ on the wireless network. Each service $S_i$ is associated with a logical channel $LC_i$ of the RF interface (20). The CPU (10) associates a transmission parameter $P_i$ with each service $S_i$ and sends the said transmission parameter $P_i$ to the logical channel $LC_i$ associated with the service $S_i$. The RF interface (20) configures the physical channel PhCh on the basis of the transmission parameter $P_i$ depending on the logical channel $LC_i$ under transmission.

10 Claims, 2 Drawing Sheets

(58) Field of Classification Search
USPC .................................................. 370/310–350
See application file for complete search history.

(56) References Cited

U.S. PATENT DOCUMENTS

| | | | | |
|---|---|---|---|---|
| 2003/0186653 | A1* | 10/2003 | Mohebbi et al. | 455/67.11 |
| 2004/0152422 | A1* | 8/2004 | Hoglund et al. | 455/67.11 |
| 2006/0286994 | A1* | 12/2006 | Kwak et al. | 455/522 |
| 2007/0097962 | A1 | 5/2007 | Yoon et al. | |
| 2007/0121542 | A1* | 5/2007 | Lohr et al. | 370/329 |
| 2007/0201397 | A1* | 8/2007 | Zhang | 370/329 |
| 2008/0064386 | A1* | 3/2008 | Nibe | 455/422.1 |
| 2008/0285670 | A1* | 11/2008 | Walton et al. | 375/260 |

FOREIGN PATENT DOCUMENTS

| | | |
|---|---|---|
| JP | 2004201156 A | 7/2004 |
| JP | 2005159690 A | 6/2005 |
| JP | 2005217783 A | 8/2005 |
| WO | 2007/078061 A2 | 7/2007 |
| WO | 2007/083913 A1 | 7/2007 |

OTHER PUBLICATIONS

"Digital cellular telecommunications system (Phase 2+); Universal Mobile Telecommunications System (UMTS); Quality of Service (QoS) concept and architecture (3GPP TS 23.107 version 7.0.0 Release 7)" Jun. 1, 2007; ETSI (42 pages).

European Search Report from EP07290972 dated Jan. 31, 2008 (in French) (7 pages).

* cited by examiner

WIRELESS COMMUNICATION DEVICE AND METHOD FOR TRANSMISSION OF SERVICES WITH DIFFERENT SECURITY LEVELS

FIELD OF THE INVENTION

The invention relates to a wireless communication device. More particularly, it relates to devices using connections associated with services offering different levels of security.

BACKGROUND

Radiofrequency communication is a mode of communication that is increasingly used to connect electronic devices to each other. For information, the use of interfaces of the Bluetooth, Wi-Fi (standard IEEE 802.11) ZigBee (standard IEEE 802.15.4) or other types is known for exchanging data between a computer, a telephone, a camera, a printer or other peripheral devices. To simplify the use of the different devices, the utilization of the provision of services that are visible to the other devices through the radiofrequency interface is known. "Service" here means an application that makes it possible to have controlled access to one or more resources of the communication device.

For example, a printer with a Wi-Fi interface will regularly emit a message to propose a printing service. The printing service consists in printing a file that has been sent to it. A device such as a laptop computer or a camera with an interface of the same type that is located in the emission range of the printer may inform its user that the printing service is available. The user may then decide to print on the printer from the device.

The idea of service may also be seamless for the user. That is the case with terminals providing access to an information network, where transactions for logging on to the network take place without any intervention from the user. That is the case for example with user authentication services via a communicating device or simply with access to a data network.

The same communication device may be associated with different services. For example, a Personal Digital Assistant or PDA with an interface of the Wi-Fi or Bluetooth type may have a service for automatic connection to a network server for synchronization, an authentication service to identify the user of the PDA when they use another computer or exchange data with another PDA, a location service to locate the user within a site and/or receive widely broadcast messages. Several other examples are possible with the multiplication of device functionalities, such as a multimedia telephone that also performs the functions of music player and camera, while allowing use for payment transactions.

Currently, many digital communication devices use only one physical transmission channel divided into logical channels, where each logical channel supports a service that is associated with it. The logical channels are thus multiplexed in the same physical channel. In general, the physical channel is configured to guarantee minimum reception quality while guaranteeing the minimum emission power suited to all the services.

A problem occurs when simultaneous use is made of services that need to be limited to a certain distance, while offering services that require communication over a longer distance at the same time.

SUMMARY

A first aspect of the invention relates to the communication method of a communicating device with a radiofrequency communication interface and a central processing unit. The radiofrequency communication interface has at least one physical channel to exchange radio messages on a wireless network and means to multiplex at least two logical channels in the said physical channel. The central processing unit is connected to the communication interface to provide at least two services on the wireless network, each of the services being associated with a distinct physical channel of the communication interface. The central processing unit associates a transmission parameter to each service, and sends the said transmission parameter to the logical channel associated with the said service. The communication interface configures the physical channel on the basis of the transmission parameter depending on the logical channel being transmitted.

A second aspect of the invention concerns a communication device with a radiofrequency communication interface and a central processing unit. The radiofrequency communication interface has at least one physical channel to exchange radio messages on a wireless network and means to multiplex at least two logical channels in the said physical channel. With the central processing unit connected to the communication interface, the said central processing unit cooperates with the communication interface to provide at least two services on the wireless network, each of the services being associated with a distinct physical channel of the communication interface. The central processing unit has means to define at least one transmission parameter specific to each service and means to transmit the said parameter to the said communication interface. The communication interface has means to adjust at lest one parameter of the physical channel on the basis of the transmission parameter specific to the service associated with the logical channel being emitted.

The transmission parameter is preferably a maximum emission power value and/or maximum reception sensitivity.

DETAILED DESCRIPTION

Figure 1:
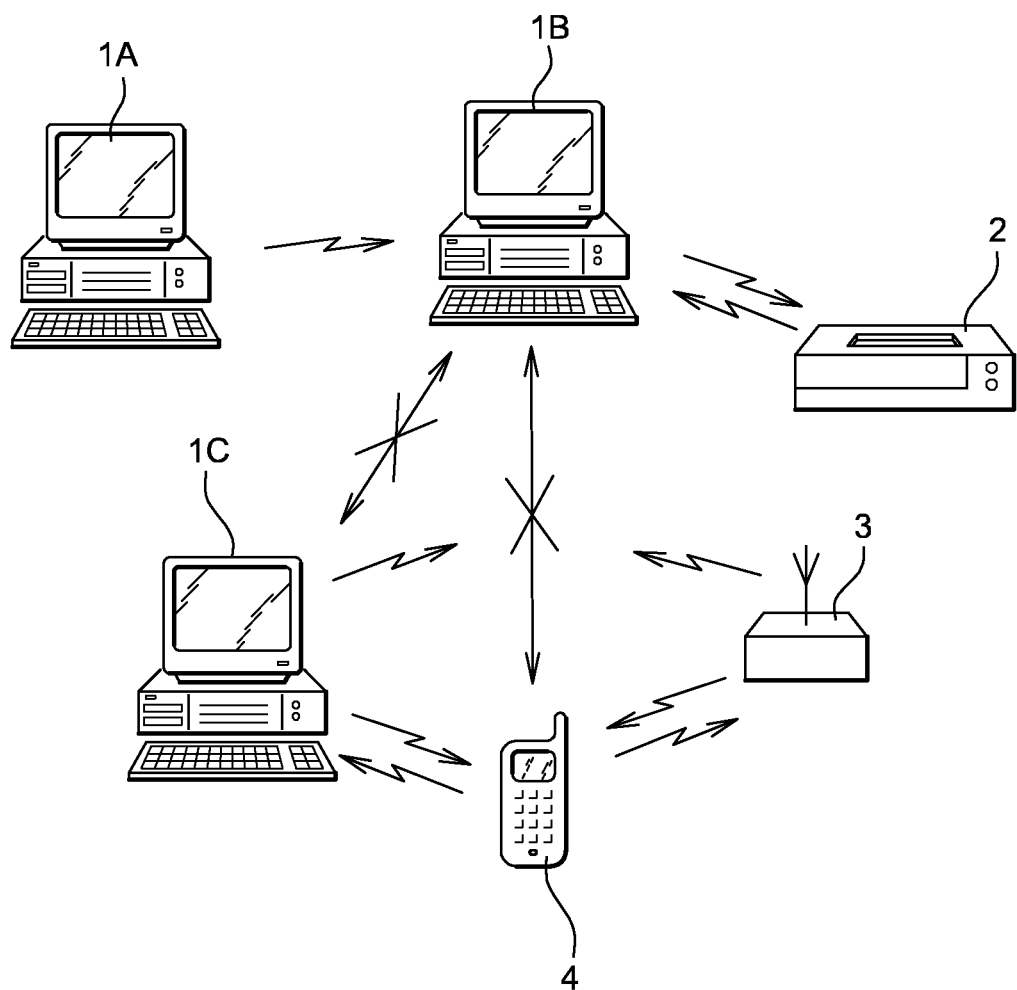
FIG. 1 illustrates a wireless communication network system using the invention.

FIG. 1 illustrates a communication network system with several types of equipment and service. As an example, the network uses the Wi-Fi standard, but another standard of communication may be used as well, such as ZigBee or Bluetooth. The system in question may be put in place in a physical area covering a few dozen square meters, such as for instance an open plan office, a flat, a library with terminals provided to the public or any other location. In the example represented, the system has fixed communication devices such as computers 1, a printer 2 or a communication terminal 3. Also, depending on the type of location where the system is placed, the communication terminal may be a terminal providing access to the Internet, an access control terminal or a data broadcasting terminal. The system further comprises a mobile communication device 4, and may comprise several of them. The mobile communication device 4 may for instance be a smart card, a PDA, a camera or a mobile phone with a Wi-Fi interface.

Among the various types of service that may exist in the system, very many possibilities are offered. The first category of services may require extended coverage over the whole zone covered by the network. As non limitative examples, that first category may include:
- exchange of files between the printer 2 and a computer 1, a camera or a multimedia mobile telephone,
- Internet connection between the computers 1 and a terminal offering access to the Internet,
- IP (Internet Protocol) telephone service between a terminal offering access to the Internet and a mobile telephone,
- location of persons present in a room by an access control terminal.

For the second category of services, it is preferable to have less extended communication, either for confidentiality reasons or to allow the reduction of the number of devices accessible. As non limitative examples, the second category may include:
- data synchronization between a PDA and a computer IA,
- exchange of files between a computer 1 and a mobile music player or mobile telephone,
- identification of the user of a computer with their card, their mobile telephone or PDA (confidentiality),
- payment of a transaction made from the computer with a mobile telephone.

In that way, a multimedia telephone may simultaneously have a file exchange service where it is preferable for the user to be able to easily identify the computer to which they wish to log on. For such applications, it is preferable that communication is restricted to a small area around the user, for instance less than a meter. For payment type transactions, or for identification with confidential data, it may also be preferable to limit communication to a few centimeters. On the other hand, a mobile telephone service must be able to use the largest communication area possible.

Figure 2:
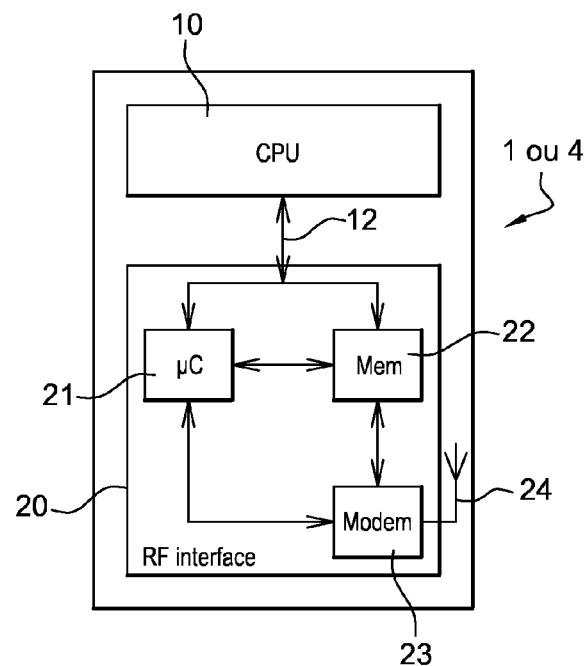
FIG. 2 represents a structural diagram.
Figure 3:
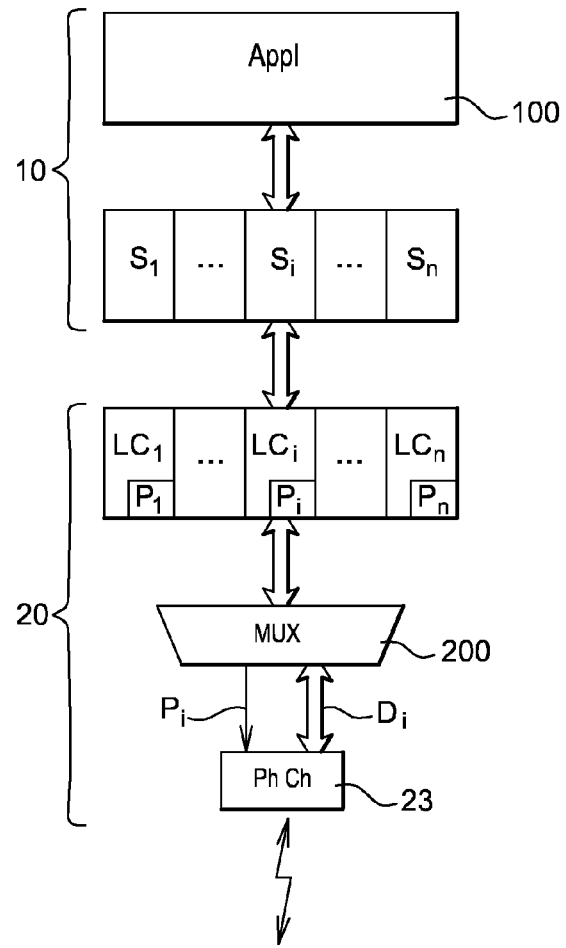
FIG. 3 represents a functional diagram of the communication device according to the invention.

FIGS. 2 and 3 both represent a fixed or mobile communication device of FIG. 1 with several logical channels using a single physical channel. FIG. 2 represents a simplified structure of the communication device 1 or 4 with a central processing unit (CPU) 10, a radiofrequency interface (RF) 20 and several other interfaces that are not represented. A central bus 12 connects the CPU 10 to the RF interface 20. The CPU 10 is the main processing unit of the communication device, which controls all the processes under way in the communication device 1 or 4. The functions of the CPU 10 include the control of all the services and peripheral devices of the communication device, particularly the services using the RF interface 20. The RF interface 20 is a communication interface, for example a Wi-Fi interface, embodied in the form of a module or integrated circuit according to a known technique.

According to one mode of embodiment, the RF interface 20 includes a microcontroller 21, a buffer memory 22, a modulation/demodulation (modem) circuit 23 and an antenna 24. The microcontroller 21 is connected to the central bus 12 to receive instructions from the CPU 10. The microcontroller 21 controls and synchronizes the transfer of data from the buffer memory 22, in which it may also read and write in order to make data packets in a protocol layer related to the transmission standard used. The microcontroller 21 is also connected to the modem 23 for controlling and commanding it. The modem 23 is connected on the one side to the memory 22 and on the other side to the antenna 24. The modem 23 transforms a train of bits present in the memory 22 into an electrical signal emitted by the antenna 24. On a reciprocal basis, the modem 23 also processes a signal from the antenna 24 into a train of bits received that it stores in the memory 22.

The buffer memory 22 is a memory, for example of the RAM type, which is used to save the data from the CPU 10 before emitting them, the data from the modem 23 before transmitting them to the CPU 10, and also parameters data. The parameters data are defined by the CPU 10 and are used to configure the RF interface 20. Once it is configured, the CPU 10 only needs to address the data specific to each service to each logical channel of the RF interface to emit or receive data.

Among the parameters data, there are protocol parameters, interface management parameters and transmission parameters. The parameters relating to the management of the RF interface 20 may include a number of logical channels managed by the interface, memory areas allocated to each logical channel, standby delays or data relating to the time multiplexing of logical channels, possibly indicating the priorities between the logical channels. The protocol parameters associated with each logical channel are used by the microcontroller to build a bit frame to be transmitted according to the protocol used.

The transmission parameters are parameters specific to the physical channel used. The transmission parameters are used by the microcontroller 21 to command the modem 23 and they include information relating among other things to the frequency of the channel, the type of modulation used, the level of sensitivity of reception and an emission power value. According to the invention, at least once transmission parameter is duplicated as many times as there are channels.

FIG. 3 illustrates the working of the communication device 1 or 4 in the form of the fulfilling of a function. The CPU 10 has an application layer 100 that is able to activate one or more communication services $S_1$ to $S_n$. The CPU 10 configures the RF interface 20 so that each service $S_1$ to $S_n$ has an associated Logical Channel $LC_1$ to $LC_n$. As indicated earlier, each logical channel includes a memory area dedicated to the data to be emitted and to be received, the protocol parameters specific to the channel and the transmission parameter $P_1$ to $P_n$ associated with the logical channel $LC_1$ to $LC_n$ and the service $S_1$ to $S_n$. The transmission parameter $P_i$ is determined directly or indirectly by the CPU 10 depending on the range required for the service Si that is associated with it.

The CPU 10 supplies the interface management parameters of the RF interface 20. The sequential processing carried out on each channel is carried out on the microcontroller 21 which sequentially exchanges the data $D_i$ of each logical channel $LC_i$ to be emitted or received by the physical channel PhCh materialized by the modem 23. The exchange carried out sequentially thus carries out the time multiplexing 200 of the logical channels $LC_1$ to $LC_n$ in the physical channel PhCh. In parallel with the exchange of data $D_i$ between the memory 22 and the modem 23, the microcontroller 21 changes the transmission parameter $P_i$ associated with the selected logical channel $LC_i$.

The transmission parameter $P_i$ is a parameter that limits the transmission range. Thus, this transmission parameter may be determined on the basis of the range required for each service $S_1$ to $S_n$. The transmission parameter $P_i$ is for example a parameter that provides a maximum emission power value or a maximum sensitivity level.

Typically, the sensitivity level makes it possible to consider only the signals received with minimum power. Typically, the higher the sensitivity level, the greater the reception amplification and thus the better a weak signal, that is a signal from a distant device, can be received. This type of parameter makes it possible to limit the pollution of a receiver by service-related signals received from devices that are too far away for such types of service.

The maximum emission power value is the radiation of the antenna. The greater that emission power, the stronger the signal received by a receiver. The electrical field produced by an antenna decreases with distance, so the emission power is proportional with the distance over which a receiver can pick up the signal at a given sensitivity level. This type of parameter is used to limit the risk of sensitive data being intercepted by a device located further away.

It is entirely possible to use a transmission parameter Pi that corresponds to a double parameter that includes both the maximum sensitivity level and the maximum emission power. In that case, maximum power and sensitivity levels that are adapted between the devices that are meant to communicate with each other must be selected.

The man of the art will note that this concerns the maximum power and the maximum sensitivity level. Depending on the protocol, this level is fixed or adjusted when a transaction is carried out or communication pre-established. In the case of a power/reception sensitivity adjustment, the transmission parameter Pi is used to limit the variation range of the adjustment independently for each logical channel.

The use of a transmission parameter relating to the emission power also offers a benefit in the area of energy saving, since limiting the power of some services automatically limits the average power consumption by the communication device. The transmission parameter is thus particularly well suited to be used in a mobile communication device, i.e. which has an independent battery that allows mobile use.

The invention claimed is:

1. A communication method of a communicating device comprising a radiofrequency communication interface and a central processing unit, the radiofrequency communication interface having at least one physical channel to exchange radio messages on a wireless network and having means to multiplex at least two logical channels in the at least one physical channel, the central processing unit being connected to the radiofrequency communication interface to provide at least two services on the wireless network, each of the at least two services being associated with a distinct logical channel of the at least two logical channels of the radiofrequency communication interface, the communication method comprising:
    for each service of the at least two services:
        associating, by the central processing unit, a transmission parameter with the service, wherein the transmission parameter limits a transmission range for services using confidential data;
        transmitting, by the central processing unit, the transmission parameter, corresponding to the service, to the distinct logical channel associated with the service; and
        configuring, by the radiofrequency communication interface, the at least one physical channel depending on the transmission parameter being transmitted and on the distinct logical channel.

2. The method of claim 1, wherein the transmission parameter is a maximum emission power value.

3. The method of claim 1, wherein the transmission parameter is a maximum reception sensitivity.

4. The method of claim 1, wherein the at least one physical channel of the radiofrequency communication interface complies with at least communication standard selected from a group consisting of Bluetooth standard, ZigBee standard, and Wi-Fi standard.

5. A communication device comprising:
    a radiofrequency communication interface with at least one physical channel to exchange radio messages on a wireless network and configured to multiplex at least two logical channels in the said physical channel, and
    a central processing unit connected to the communication interface, the central processing unit cooperating with the radiofrequency communication interface to provide at least two services on the wireless network, each of the at least two services being associated with a distinct logical channel of the at least two logical channels of the radiofrequency communication interface, the central processing unit configured to:
        define at least one transmission parameter specific to each service of the at least two services and transmit the transmission parameter to the radiofrequency communication interface, wherein the transmission parameter limits a transmission range for services using confidential data,
    wherein the radiofrequency communication interface is configured to adjust at least one parameter of the at least one physical channel depending on the transmission parameter specific to the service associated with the logical channel.

6. The communication device of claim 5, wherein the transmission parameter is a maximum emission power.

7. The communication device of claim 5, wherein the transmission parameter is a maximum reception sensitivity.

8. The communication device of claim 5, wherein the at least one physical channel of the radiofrequency communication interface complies with at least one communication standard selected from a group of communication standards consisting of Bluetooth standard, ZigBee standard, and Wi-Fi standard.

9. The communication device of claim 5, further comprising an independent battery configured to power the communication device when the communication device is in mobile use.

10. A communication method of a communicating device comprising a radiofrequency communication interface and a central processing unit, the radiofrequency communication interface having at least one physical channel to exchange radio messages on a wireless network and having means to multiplex at least two logical channels in the at least one physical channel, the central processing unit being connected to the radiofrequency communication interface to provide at least two services on the wireless network, each of the at least two services being associated with a distinct logical channel of the at least two logical channels of the radiofrequency communication interface, the communication method comprising:
    for each service of the at least two services:
        associating, by the central processing unit, a transmission parameter with the service, wherein the transmission parameter limits a transmission range for services using confidential data based on the services using confidential data;
        transmitting, by the central processing unit, the transmission parameter, corresponding to the service, to the distinct logical channel associated with the service; and
        configuring, by the radiofrequency communication interface, the at least one physical channel depending on the transmission parameter being transmitted and on the distinct logical channel.

* * * * *